US007444238B1

(12) United States Patent
Opitz

(10) Patent No.: US 7,444,238 B1
(45) Date of Patent: Oct. 28, 2008

(54) GLOBAL POSITION MAPPING SYSTEM HAVING A MOBILE DOCKING STATION AND METHOD FOR USE OF SAME

(75) Inventor: Rodney Paul Opitz, Arlington, TX (US)

(73) Assignee: Uniden America Corporation, Fort Worth, TX (US)

( * ) Notice: Subject to any disclaimer, the term of this patent is extended or adjusted under 35 U.S.C. 154(b) by 844 days.

(21) Appl. No.: 11/047,316

(22) Filed: Jan. 31, 2005

(51) Int. Cl.
*G01C 21/30* (2006.01)
(52) U.S. Cl. ........................................ 701/208; 701/212
(58) Field of Classification Search ......... 701/200–214; 342/357.06–357.13
See application file for complete search history.

(56) References Cited

U.S. PATENT DOCUMENTS 6,321,158 B1 * 11/2001 DeLorme et al. ............ 701/201

6,965,816 B2 * 11/2005 Walker ........................ 701/16

* cited by examiner

*Primary Examiner*—Richard M. Camby
(74) *Attorney, Agent, or Firm*—Lawrence R. Youst; Patton Boggs LLP

(57) ABSTRACT

An apparatus, method and system for generating a map using a global positioning system (100). According to one embodiment, the present invention is a mapping apparatus capable of automatically loading the most relevant local map data to a handheld mapping device (112) as needed. The mapping apparatus comprises a handheld mapping device (112) incorporating a wide area base database (158) and a local area detail database (160). The apparatus further comprises a mobile docking station (114) incorporating a wide area detail database (172) and software operable to update the local area detail database (160).

20 Claims, 5 Drawing Sheets

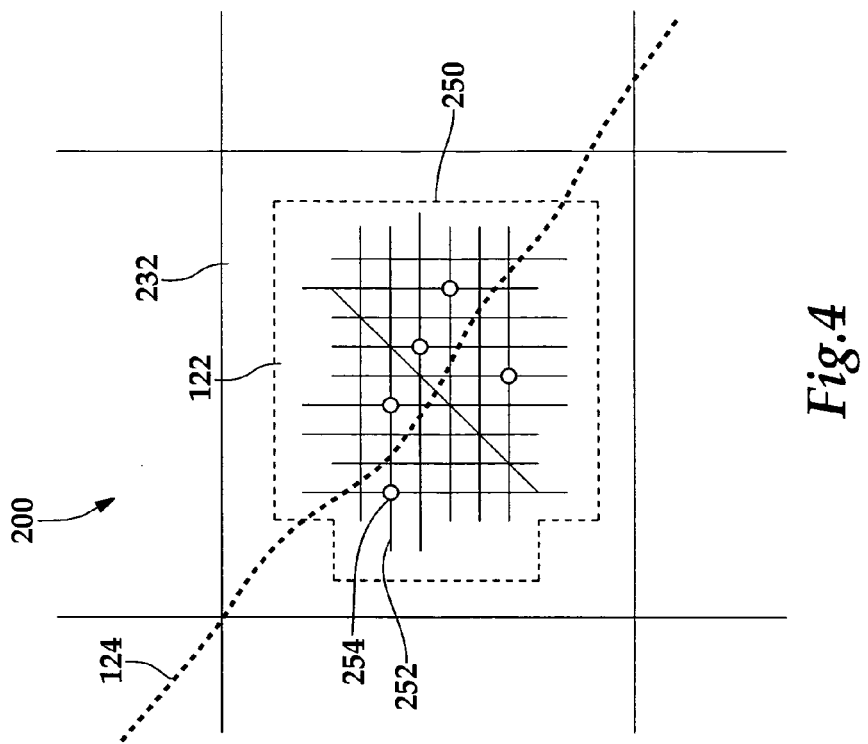
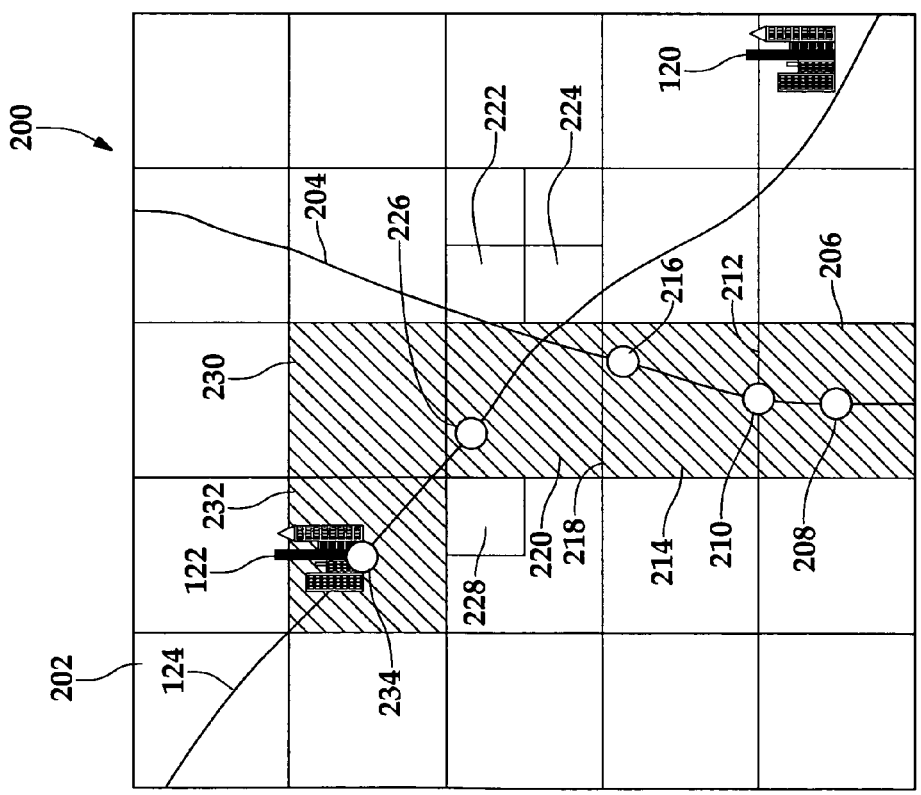
Fig.4
Fig.3

GLOBAL POSITION MAPPING SYSTEM HAVING A MOBILE DOCKING STATION AND METHOD FOR USE OF SAME

TECHNICAL FIELD OF THE INVENTION

The present invention relates, in general, to a global position mapping system and, more specifically, to a mobile docking station for a global positioning receiver wherein the mobile docking station has the capability to provide map data to the global positioning receiver.

BACKGROUND OF THE INVENTION

The United States Federal Government's NAVSTAR system, known generically as the global positioning system (GPS), provides worldwide positioning capability to its users with a system employing a set of fixed ground-based GPS controllers and a set of GPS satellites providing information suitable for use by passive GPS receivers. At any given time, there are at least 24 GPS satellites in operation, each orbiting Earth once every 12 hours at an altitude of 11,000 nautical miles. The position of each GPS satellite in the GPS system is calculated based on the relationship between that GPS satellite and one or more of the fixed ground-based GPS controllers.

Various components of the GPS system are operable to determine the distance between themselves, and therefore their respective positions, based on the time elapsed between the transmission of an electromagnetic signal by one GPS component and the receipt of the signal by another. Using this methodology, the GPS system has the capability to accurately determine the position of each GPS satellite with respect to the fixed ground-based GPS controllers, and therefore to the Earth itself.

Given that the electromagnetic GPS signals are traveling at the speed of light and that the distances involved are relatively short, the accuracy of the distance calculation depends on highly accurate timing synchronization, which is handled primarily with atomic clocks disposed within the various components of the system.

Each of the GPS satellites transmits signals to the other components of the GPS system. Civilian GPS satellite signals are transmitted at a frequency of 1575.42 MHz in the UHF band, while military GPS signals are transmitted at 1227.6 MHz. Signals at these frequencies can pass through clouds and fog, but will not pass through most solid objects such as buildings and mountains. Accordingly, a passive GPS receiver must have a clear line-of-sight to the GPS satellites necessary for positioning. A GPS satellite signal contains a pseudorandom satellite identification code, "ephemeris data" and "almanac data". Ephemeris data reflects satellite status and current date and time. Almanac data discloses the position of the GPS satellite and other GPS satellites in the system.

Within this framework of GPS satellites having known positions at known times, a passive GPS receiver can determine its position with respect to the Earth using the signal delay reckoning method described above. Signals from multiple satellites are required in order to calculate the position of the passive GPS receiver. Given the signal from only a single GPS satellite, a passive GPS receiver can determine only that it is at a point on a sphere of a known radius centered on a GPS satellite having a known position. Given the signal from two GPS satellites, a passive GPS receiver can determine that it is at a point on the intersection of two spheres having known radii and known central points. Based on the principles of geometry, the intersection of two such spheres is a circle lying on the plane of intersection of the two spheres. Given the signal from three GPS satellites, a passive GPS receiver can determine that it is at a point on the intersection of three spheres having known radii and known central points. The intersection of three spheres is a set of two discrete points. Accordingly, given three GPS satellite signals, a passive GPS receiver can limit the range of its possible locations to two discrete points in three-dimensional space. In practice, it is often the case that only one of these two points is near the surface of the Earth. Given four or more GPS satellite signals, the location of the passive GPS receiver can be limited to a single discrete point within a certain margin of error. As the number of GPS satellites is increased, the margin of error is, of course, reduced.

The utility of a GPS receiver to the user is much improved through the inclusion of map display capability within the GPS receiver. With this capability, the user of a GPS receiver is able to reference his or her present global position to nearby roads, geographic landmarks, and other points of interest included in the map data stored within, and displayed by, the GPS receiver.

SUMMARY OF THE INVENTION

According to one embodiment, the present invention is a mapping apparatus capable of automatically loading the most relevant local map data to a handheld mapping device as needed. The mapping apparatus comprises a handheld mapping device, a docking station, a wide area detail database, a wide area base database, a local area detail database and a local area detail database update module.

The handheld mapping device comprises a global positioning receiver that is in communication with a plurality of global positioning satellites and a display for visually representing the location of the apparatus relative to geographical data. The handheld mapping apparatus is communicably linked to a docking station operable to share data with the handheld mapping device.

The docking station is operably connected to the wide area detail database which contains detailed geographic data for a wide geographic area. The detailed geographic data may include the precise layout and names of local streets and the location of local landmarks, addresses and other points of interest as examples.

On the other hand, the handheld mapping device incorporates a wide area base database the contents of which are limited to relatively large-scale geographic data for the wide geographic area. The geographic data incorporated within the wide area base database may include the layout of interstate highways, waterways and state lines and the general location of municipalities and airports as examples.

The handheld mapping device also incorporates a local area detail database which contains a subset of the detailed wide area geographic data stored within the wide area detail database. The contents of the local area detail database are managed by a local area detail database update module which is operable to update the local area detail database with detailed geographic data from the wide area detail database according to positional data received from the global positioning receiver.

In another aspect, the present invention is directed to a method of generating a map including providing a wide area detail database containing detailed wide area geographic data incorporating data of a first geographic data type for a wide geographic area, providing a wide area base database containing geographic data for the wide geographic area incorporating data of a second geographic data type for the wide geographic area, receiving a global positioning signal at a handheld mapping device, calculating the current position of the handheld mapping device of the from the global positioning signal, comparing the current position of the handheld mapping device to a prior position stored within a memory space, updating a local area detail database containing a subset of the wide area detail database whenever the current position of the handheld mapping device varies from the prior position by more than a predetermined distance and generating and displaying a map incorporating at least a portion of the data contained in the local area detail database.

In yet another aspect, the present invention is directed to a system for generating a map that includes a handheld mapping device, a docking station operably connected to the handheld mapping device and a set of global positioning satellites generating global positioning signals. The docking station is furthermore operably connected to a wide area detail database incorporating detailed geographic data for a wide geographic area.

The handheld mapping device is operable to receive global positioning signals from the satellites and thereby determine the current position of the handheld mapping device. The handheld mapping device also incorporates a wide area base database incorporating data of a second geographic data type for the wide geographic area and a map generation software module for generating and storing a local area detail database within the handheld mapping device whenever the current position of the handheld mapping device varies from a prior position of the handheld mapping device by more than a predetermined distance. The local area detail database contains a subset of the detailed geographic data stored within the wide area detail database. The handheld mapping device also includes a map display software module for displaying a local geographic map incorporating geographic data of the first geographic data type stored in the local area detail database.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3 is a top view of a wide area map according to certain embodiments of the present invention;

FIG. 4 is a top detail view of the wide area map of FIG. 3;

DETAILED DESCRIPTION OF THE DRAWINGS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
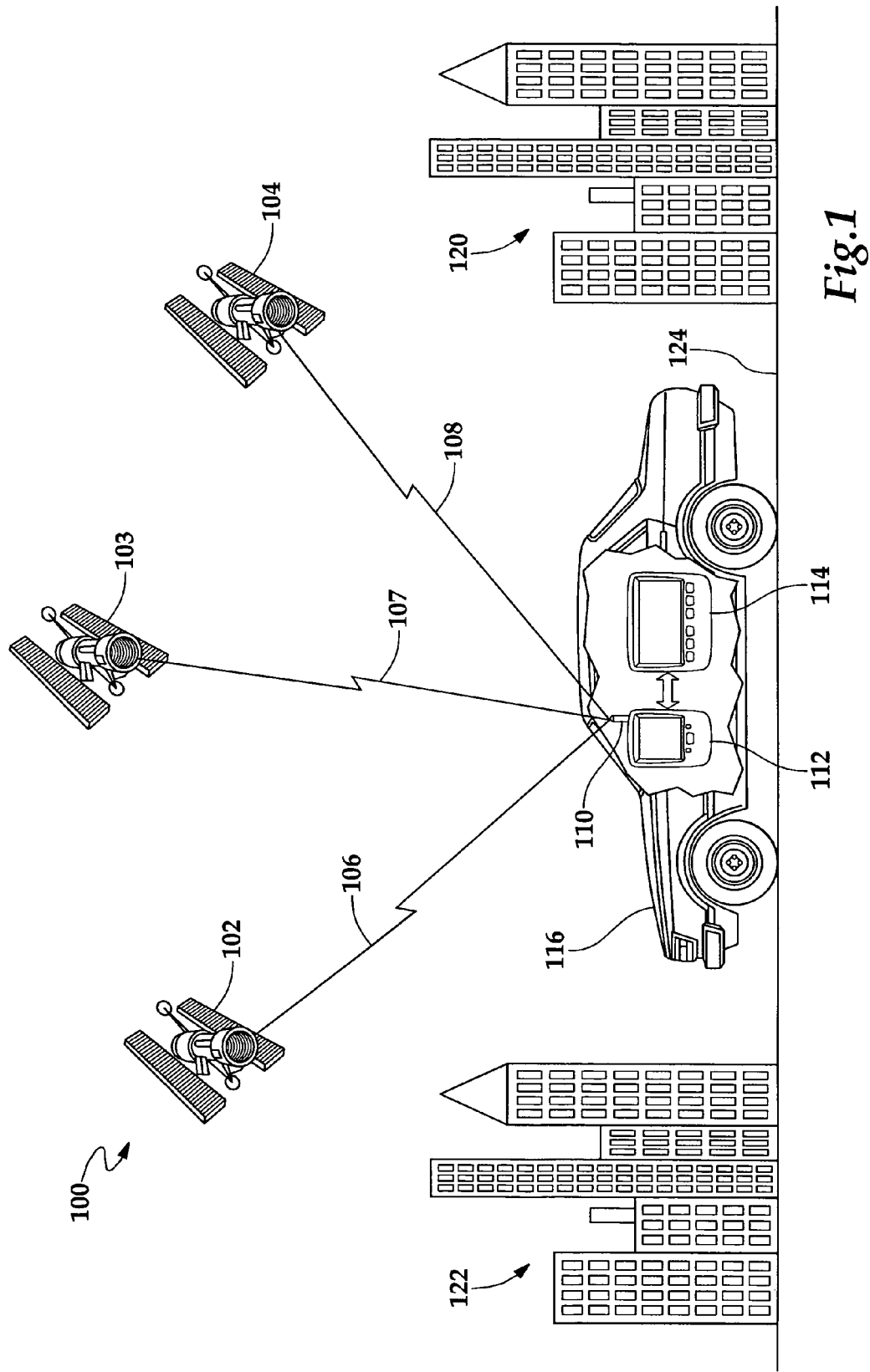
FIG. 1 is a side view of a global positioning system incorporating a handheld receiver and a mobile docking station according to certain embodiments of the present invention.

Turning initially to FIG. 1, a global positioning system (GPS) 100 is depicted therein incorporating a mobile GPS receiver 112 operably connected to a mobile docking station 114. The global positioning system 100 incorporates a set of GPS satellites 102-104, each transmitting a GPS signal 106-108, respectively. Each of the GPS signals 106-108 may include a satellite identification code, satellite status data, the current date and time and the position of the GPS satellite 102-104 transmitting the GPS signal 106-108 and of other GPS satellites 102-104 in the GPS system 100.

As discussed above, GPS signals 106-108 from multiple GPS satellites 102-104 are required in order to calculate the position of the GPS receiver 112. In fact, the three GPS satellites 102-104 shown in FIG. 1 may not be sufficient to conclusively determine the current position of GPS receiver 112, and additional GPS satellites (not shown) may, in fact, be necessary to fully locate the GPS receiver 112.

As shown in FIG. 1, GPS receiver 112, disposed within vehicle 116, acquires GPS signals 106-108 via GPS antenna 110. Using GPS signals 106-108, the GPS receiver 112 can calculate the location of vehicle 116 along roadway 124 between city 120 and city 122. GPS receiver 112 is operably connected to mobile docking station 114, through which it is operable to update the data stored therein, in a manner shown and described in further detail below.

Figure 2:
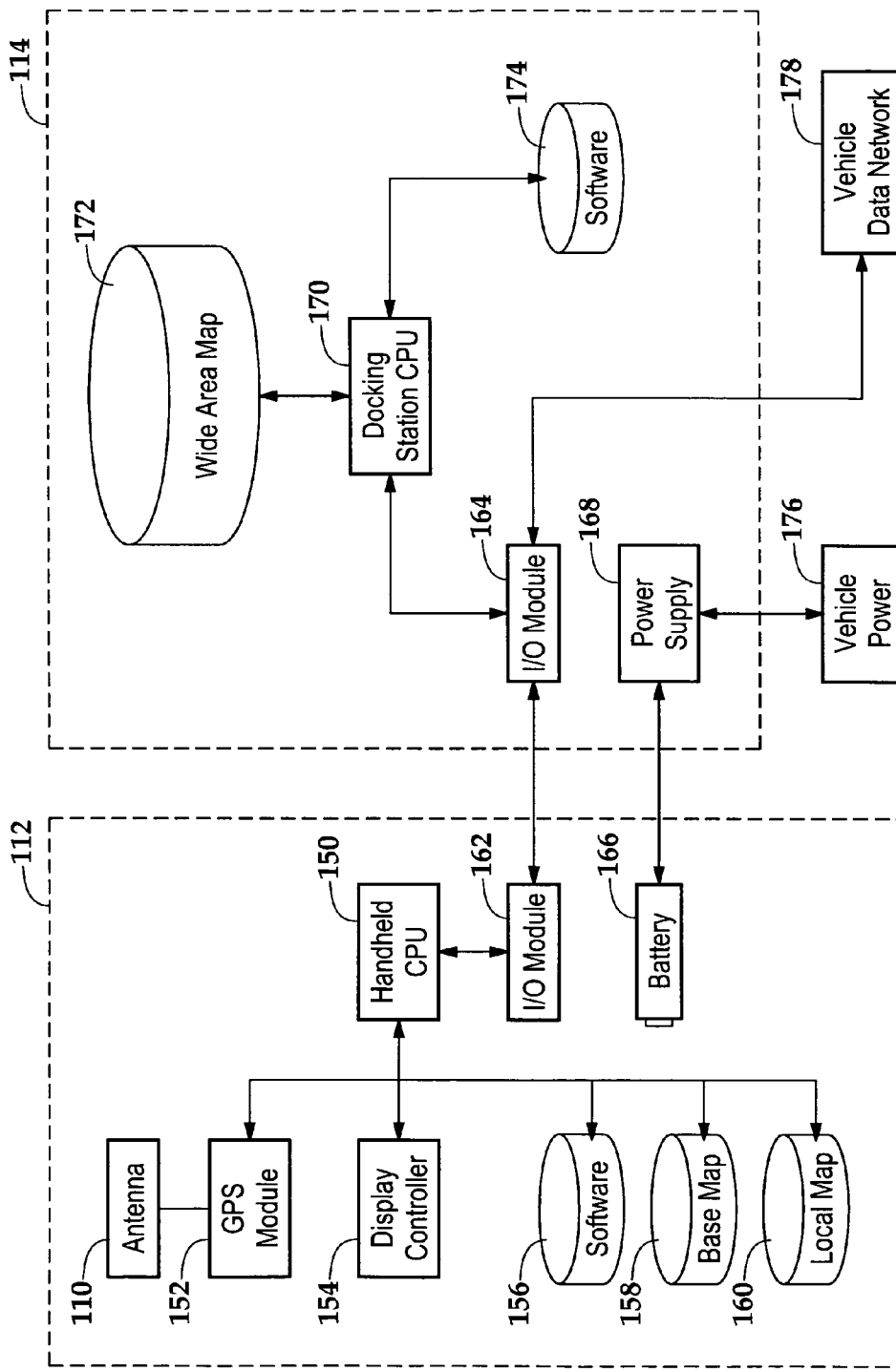
FIG. 2 is a schematic view of a global positioning receiver operably connected to a mobile docking station according to certain embodiments of the present invention.

Turning to FIG. 2, depicted therein is a schematic diagram showing GPS receiver 112, mobile docking station 114 and components of vehicle 116. GPS receiver 112 is controlled by handheld CPU 150, which is operably connected to the principal functional components of GPS receiver 112, including GPS module 152, display controller 154, software database 156, base map database 158, local map database 160 and input/output module 162. GPS module 152 determines the global position of GPS receiver 112 based on signals received via antenna 110 and provides this information to CPU 150 and the other functional components of GPS receiver 112. Based upon the current position information, CPU 150 directs display controller 154 to display location information based on data stored in map databases 158, 160 and programming instructions stored in software database 156. Input/output module 162 communicates with mobile docking station 114 via input/output module 164 of mobile docking station 114 whenever GPS receiver 112 is docked. In the embodiment shown in FIG. 2, input/output module 164 is operably connected to vehicle data network 178 in order to share data with other components of vehicle 116. Power to GPS receiver 112 is provided by power supply 168 when the GPS receiver 112 is docked to mobile docking station 114, and provided by battery 166 whenever GPS receiver 112 is not docked. Power supply 168 is normally supplied by vehicle power 176, although mobile docking station 114 may also incorporate an internal battery (not shown).

In a similar manner to GPS receiver CPU 150, mobile docking station CPU 170 controls and coordinates the operations of mobile docking station 114 according to software instructions stored within software database 174. As described above, one of the primary functions of mobile docking station 114 is to update the data stored in GPS receiver 112 as needed. In order to optimize consumer demand for handheld devices such as GPS receiver 112, its size, weight and cost are ideally minimized. In order to control the size, weight and cost of the handheld GPS receiver 112, components must either be omitted or minimized in size, weight and cost. In order for a GPS receiver to have mapping capability based on an internal map, some level of memory storage is fundamental. Accordingly, memory storage is not a component which can be completely omitted from the product design. The ideal amount of memory capacity must, however, be balanced against the weight, volume and cost budgets for the GPS receiver 112 as a whole.

According to the embodiment shown in FIGS. 1 and 2, the necessarily limited memory capacity available in local map database 160 is optimized through an automatic database update functionality, which serves to automatically update the detailed local map database as the GPS receiver 112 moves from one location to another in a vehicle. Using this method, the user of GPS receiver 112, beginning in a first location, such as city 120, may have the local map data for city 120 stored within the local map database 160. After returning to his or her vehicle 116, the user would generally connect the GPS receiver 112 to the mobile docking station 114 and then drive from the first location to a second location, such as city 122.

As the GPS receiver 112 moves from city 120 to city 122, the GPS receiver 112 would receive periodic updates to the local map database 160 from wide area map database 172, in order to maintain the data within local map database 160 and keep it current with respect to the present location of GPS receiver 112. Once the user arrives at his or her destination, the user can disconnect the mobile docking station 114 from the GPS receiver 112, which will already be loaded with the local map details for the geographic area surrounding the then-current location of the GPS receiver 112. Although wide area map database 172 is shown as a single database, it will be appreciated by those of skill in the art that wide area map database 172 may represent two or more separate databases, such as a first database stored on an internal hard drive, a second database stored on a CD-ROM, DVD-ROM or flash memory card and a third database accessed via a wireless internet connection, as an example.

The updating methodology may vary from one embodiment to another, but in the embodiment shown in FIG. 2, updating of the local map database 160 is conducted by GPS receiver CPU 150 based upon map data stored in wide area map database 172 and provided by mobile docking station 114 through input/output module 164. As noted, updating of the local map database 160 is conducted whenever the results of a map update algorithm, which may be performed by the GPS receiver CPU 150 or the mobile docking station CPU 170, indicate that an update is appropriate.

Turning now to FIGS. 3 and 4, these figures show a wide area map 200 consisting of an array of discrete local regions 202. Wide area map 200 incorporates at least two levels of geographic data for illustration, but it will be appreciated by those of skill in the art that a particular map will generally incorporate more than two discrete levels of geographic data. Further, although the geographic data is shown for illustration as being segregated according to a grid, it will be appreciated that the geographic data in wide area map 200 may be organized according to any scheme providing for access according to global coordinates.

For the purpose of illustration, a beginning location 208 is shown within local region 206. At this point in time, the base map database 158 within GPS receiver 112 will contain all of the geographic data of a first type for the entire wide area map 200. This first type of geographic data may include, but is not limited to, data relating to the layout of major highways and waterways, the general location of major cities and airports, and national and state political boundaries, as examples. All of this data is stored within base map database 158 for the entire wide area map 200, and is generally not modified or updated by the mobile docking station 114. The inclusion of the entirety of this data within the GPS receiver 112 is possible owing to the limited level of detail included in the data.

A second type of geographic data is stored within wide area map database 172 within the mobile docking station 114. This second type of geographic data includes a higher level of detailed information about the wide area map 200. This second type of geographic data may include, but is certainly not limited to, the layout of local streets and tributaries, the location of local points of interest, and county and city political boundaries, as examples.

Whatever the content included within the wide area detail data, the entirety of this data is stored within wide area map database 172 of mobile docking station 114. Owing to the relatively detailed nature of this type of data, the memory capacity necessary to store all of this data for the entire wide area map 200 far exceeds the capacity available within GPS receiver 112. It is, however, desirable to have the local portion of this data available within GPS receiver 112. Accordingly, the apparatus and methods of the present invention allow for automatic updating of the detailed geographic data within local map database 160 as appropriate.

As the vehicle 116 travels across local region 206 from location 208 to location 210 on road 204, the GPS receiver 112 periodically calculates location updates using the GPS signals 106-108 received from GPS satellites 102-104. As vehicle 116, and therefore GPS receiver 112, approach region boundary 212 between local region 206 and adjoining local region 214, the GPS receiver 112 will be updated by the mobile docking station 114 with the detailed geographic data for local region 214. In general, it is preferable that the GPS receiver 112 be loaded with the detailed geographic data for local region 214 prior to the entry of vehicle 116 into local region 214.

As the vehicle 116 continues along road 204 to location 216, it will approach local region boundary 218 shared by local region 214 and local region 220. At or about location 216, another update of local map database 160 is necessary, including the detailed geographic data for local region 220. Depending on the algorithm employed, GPS receiver 112 may also be loaded with the detailed geographic data for sub-regions 222 and 224 at this time, in order to provide the user with all of the detailed data for the vicinity. As noted above, the exact algorithm employed for subdividing the detailed data within wide area map 200 will vary from one embodiment to another.

After traveling into local region 220, the vehicle 116 transfers from road 204 over to road 124, after which it travels to location 226. At location 226, the vehicle 116 is about to cross over into local region 230 for a short time, and then into local region 232. At this point, the GPS receiver 112 could be loaded with all of the data for local region 230. Alternately, it could be loaded with a subset of the detailed data in local region 230. In a sparsely populated rural area, the distinction may not be significant, as most of the detail data can be expected to be found along road 124. In a heavily-populated urban area, only a small portion of the local detail data for region 230 may be found adjacent to road 124, such that a higher level of granularity would be appropriate.

In a similar vein, the GPS receiver 112 may be loaded with the local detail data for an adjacent region or subregion, such as subregion 228, despite the fact that road 124 does not traverse subregion 228 and vehicle 116 may be unlikely to traverse that area. There may be some local detail of importance to the user within subregion 228, and certain embodiments may be programmed to load the local detail data for this area into GPS receiver 112.

After leaving local region 230, vehicle 116 continues along road 124 across local region 232, ultimately arriving at location 234 within city 122. At this point in time, the GPS receiver 112 will be loaded with the local detail data for region 232, which will include the local detail data for city 122. This data is shown in detail in FIG. 4. As discussed above, this data would generally include the city limits 250 of city 122, local streets 252 and points of interest 254. Points of interest 254 would generally include local landmarks. Although FIG. 4 depicts only a few streets 252 and points of interest 254 for illustration, it will be understood by those of skill in the art that the map of a major city generally incorporates a massive amount of geographic information. Further, the information relating to the streets 252 will generally include not only the layout of the streets 252, but also related information, including street names and the layout of address numbering along each street 252, as examples.

In the context of the present invention, the information depicted in FIG. 4 comes from at least two separate map databases. As discussed above, the mapping data related to large-scale geographic features, which may include all of the mapping data related to road 124, is stored within the GPS receiver 112 in the wide area base map database 158. In certain embodiments, the boundaries of the local regions, including local region 232, may also be included in the content of wide area base map database 158. As described above, local details including the layout of city limits 250 and city streets 252 and the precise location of points of interest 254 will generally be stored in and retrieved from local map database 160. Accordingly, GPS receiver 112 generally must access both of databases 158, 160 in order to generate a comprehensive map including the relevant geographic features.

The level of detail included in this data is not, of course, limited to the above-described data. Alternate embodiments could, for example, also include the type of information found in a local telephone directory, such as the addresses, phone numbers and even website data for individuals, local businesses, government agencies and other entities. This data could also include public data such as tax and lien records, voter registration data, and custom data provided by the user or the user's employer.

Figure 5:
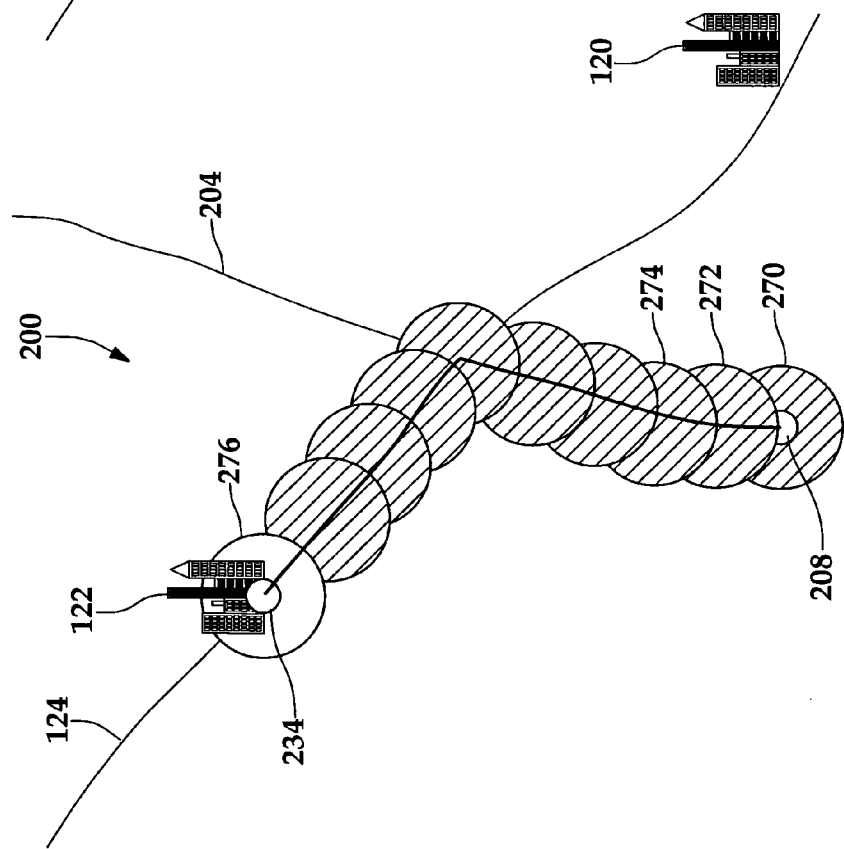
FIG. 5 is a top view of a wide area map according to certain embodiments of the present invention.

FIG. 5 depicts an alternate embodiment of the present invention wherein the information in wide area map 200 is organized in a more amorphic manner than depicted in FIGS. 3 and 4. According to this embodiment, the data within local map database 160 is updated whenever vehicle 116 travels a predetermined distance from a prior location, or waypoint. Vehicle 116 begins at location 208 on road 204 having the data for local region 270 loaded into local map database 160. Local region 270 includes all of the area within a certain radius of location 208.

At a certain point in time, the distance between vehicle 116 and location 208 will exceed the predetermined distance for triggering an update of the local map database 160. At this point, the local map database 160 will be updated with the local detail data for local region 272, which will include the geographic area within the aforementioned radius of the then-current location of the vehicle 116. Subsequently, the data for local region 274, and the remaining local regions shown in FIG. 5 will be periodically loaded in the same manner as vehicle 116 travels from location 208 circumscribed by local region 270 to location 234 circumscribed by local region 276, which includes city 122.

Figure 6:
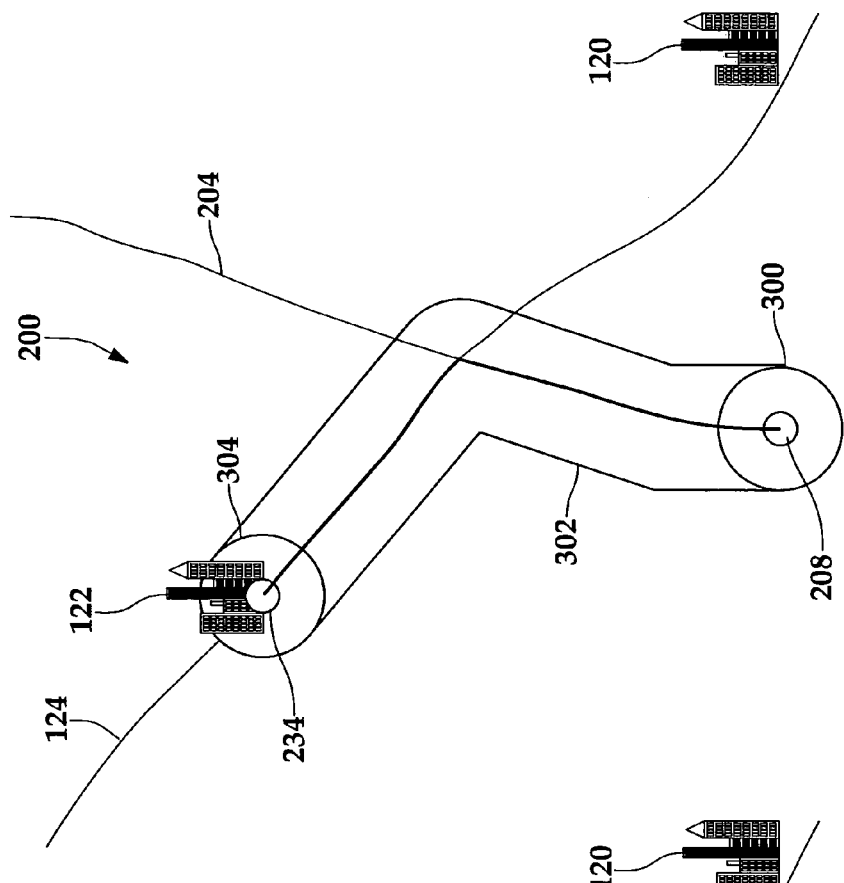
FIG. 6 is a top view of a wide area map according to certain embodiments of the present invention.

FIG. 6 depicts another embodiment of the present invention wherein the information in wide area map 200 is provided in an even less rigid manner than that depicted in FIG. 5. According to this embodiment, the data within local map database 160 is updated continuously as vehicle 116 travels from location 208 to location 234. Vehicle 116 begins at location 208 on road 204 having the data for local region 300 loaded into local map database 160. As above, local region 300 includes all of the area within a certain radius of location 208.

Periodically, the GPS receiver 112 is provided with updates to the local map database 160 in order that all local detail data encompassed within the then-current local region is stored therein. As described above, the local map database 160 will be updated to include all of the local detail data for the geographic area within the aforementioned radius of the then-current location of the vehicle 116. Local detail data will be periodically updated in the same manner as vehicle 116 travels from location 208, circumscribed by local region 300, to location 234 circumscribed by local region 304, which includes city 122.

Figure 7:
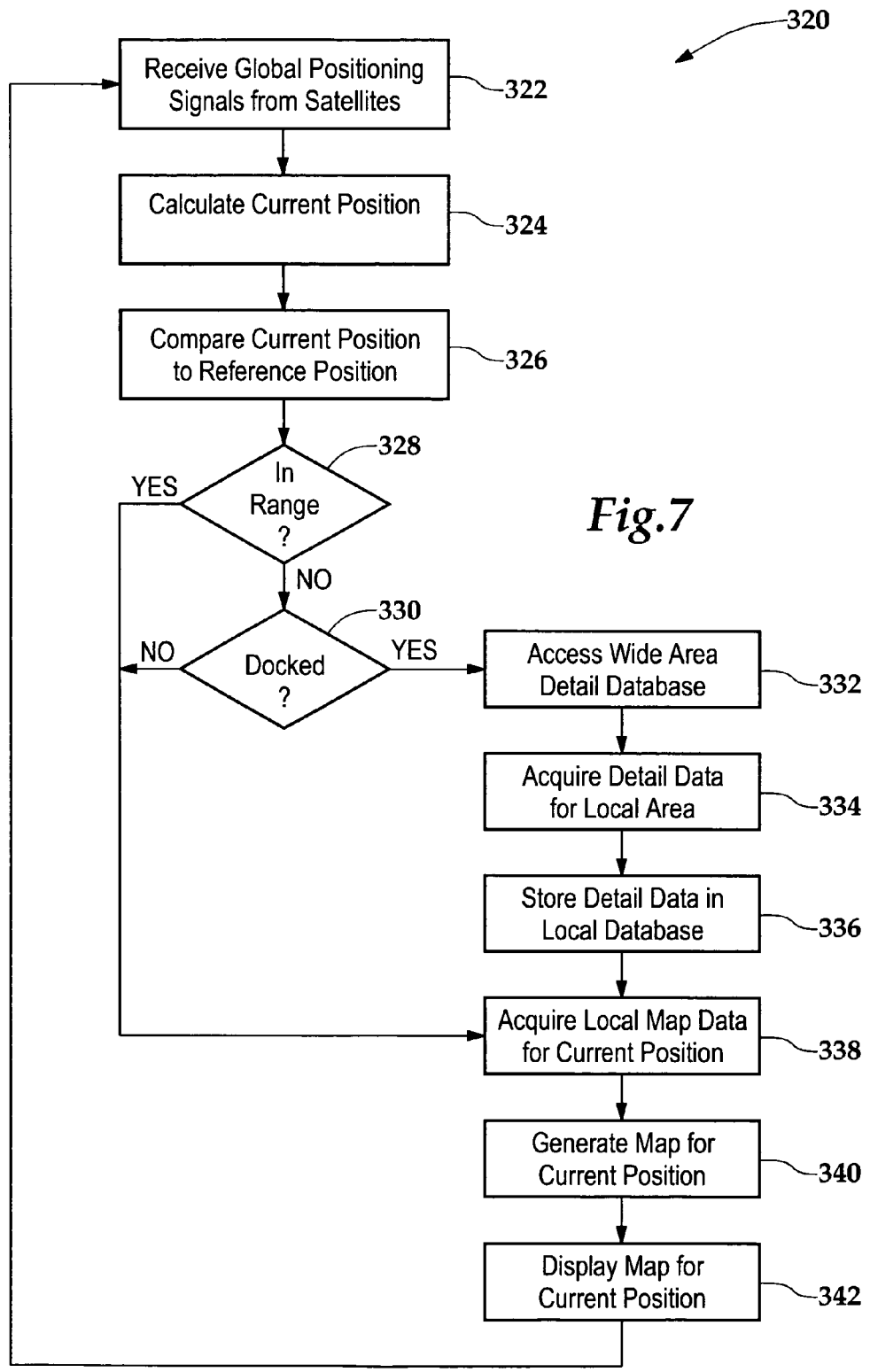
FIG. 7 is a flowchart depicting a method of updating a local area detail database according to certain embodiments of the present invention.

The method of one embodiment of the present invention is shown in flowchart form in FIG. 7. According to flowchart 320, the process begins in block 322, wherein the GPS receiver 112 receives global positioning signals 106-108 from satellites 102-104. Using this data, the GPS receiver 112 calculates its current position, as represented by block 324, which is compared to a reference position or waypoint in block 326.

If the distance between the current position of the GPS receiver 112 and the reference position is less than a certain distance (decision block 328), the GPS receiver 112 acquires local map data for the current position in block 338, generates a map of the local position in block 340 and displays the map in block 342. Process flow then returns to block 322. If the minimum distance for an update is set to a relatively large value, the local map database 160 will contain data having a pattern similar to that shown in FIG. 5. As the minimum distance for an update is reduced, the local map database 160 will contain data having a pattern more closely approximating that shown in FIG. 6.

In the event that the distance traveled exceeds the minimum travel distance for an update, the GPS receiver 112 will determine whether it is docked with the mobile docking station 114 in decision block 330. If it is not docked, process flow jumps to block 338 and proceeds as described above. If the GPS receiver 112 is docked, the GPS receiver 112 will access the wide area map database 172 in block 332, acquire the geographic detail data for the local area in block 334 and store the acquired geographic detail data in the local map database 160 in block 336. Process flow then moves to block 338 and proceeds as described above.

The above method relates primarily to the type of map depicted in FIGS. 5 and 6. The method for the type of map depicted in FIGS. 3 and 4 would proceed in a similar manner, except that updates to the local map are triggered by local region boundaries rather than distance from fixed reference points.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A mapping apparatus comprising:
   a handheld mapping device having a global positioning receiver;
   a mobile docking station operable to share data with the handheld mapping device;
   a wide area detail database operably connected to the docking station, containing data of a first geographic data type for a wide geographic area;
   a wide area base database disposed within the handheld mapping device, containing data of a second geographic data type for the wide geographic area;
   a local area detail database disposed within the handheld mapping device, containing data of the first geographic data type for a local geographic area comprising a portion of the wide geographic area; and
   a local area detail database update module operable to update the local area detail database with data from the wide area detail database according to positional data received from the global positioning receiver.

2. The mapping apparatus as recited in claim 1 wherein the second type of geographic data comprises data relating to at least one of national boundaries, state lines, interstate highways, coastlines and major waterways.

3. The mapping apparatus as recited in claim 1 wherein the first type of geographic data comprises data relating to at least one of city limits, streets and minor waterways.

4. The mapping apparatus as recited in claim 1 wherein the first type of geographic data comprises local addresses and phone numbers.

5. The mapping apparatus as recited in claim 1 wherein the wide area detail database comprises data stored on at least one of a hard drive, CD-ROM media, DVD-ROM media and flash media.

6. The mapping apparatus as recited in claim 1 wherein the docking station is disposed within a vehicle.

7. The mapping apparatus as recited in claim 1 wherein the wide area detail database is disposed at least partly within the docking station.

8. A method of generating a map on the display of a handheld mapping device comprising:
   providing a wide area detail database at least partially disposed within a mobile docking station containing data of a first geographic data type for a wide geographic area;
   providing a wide area base database within a handheld mapping device containing data of a second geographic data type for the wide geographic area;
   receiving a global positioning signal at the handheld mapping device;
   calculating the current position of the handheld mapping device of the from the global positioning signal;
   comparing the current position of the handheld mapping device to a prior position stored within a memory space;
   updating within the handheld mapping device a local area detail database containing data of the first geographic data type for a local geographic area comprising a portion of the wide geographic area whenever the current position of the handheld mapping device varies from the prior position by more than a predetermined distance; and
   generating and displaying a map incorporating at least a portion of the data contained in the local area detail database.

9. The method as recited in claim 8 wherein the second type of geographic data comprises data relating to at least one of national boundaries, state lines, interstate highways, coastlines and major waterways.

10. The method as recited in claim 8 wherein the first type of geographic data comprises data relating to at least one of city limits, streets and minor waterways.

11. The method as recited in claim 8 wherein the first type of geographic data comprises local addresses and phone numbers.

12. The method as recited in claim 8 wherein the wide area detail database comprises data stored on at least one of a hard drive, CD-ROM media, DVD-ROM media and flash media.

13. The method as recited in claim 8 wherein the wide area detail database is partially disposed within the mobile docking station and partially disposed outside of the mobile docking station.

14. The method as recited in claim 13 wherein the mobile docking station is disposed within a vehicle.

15. A system for generating a map comprising:
   a mobile docking station operably connected to a wide area detail database containing detailed wide area geographic data, incorporating data of a first geographic data type for a wide geographic area;
   a set of global positioning satellites, each generating a global positioning signal;
   a handheld mapping device operable to receive global positioning signals and thereby determine the current position of the handheld mapping device;
   a wide area base database, disposed within the handheld mapping device, incorporating data of a second geographic data type for the wide geographic area;
   a map generation software module for generating and storing within a handheld mapping device, a local area detail database for a local geographic area, containing a subset of the data of the first geographic data type for the wide geographic area whenever the current position of the handheld mapping device varies from a prior position of the handheld mapping device by more than a predetermined distance; and
   a map display software module for displaying a local geographic map incorporating geographic data of the first geographic data type stored in the local area detail database.

16. The system as recited in claim 15 wherein the second type of geographic data comprises data relating to at least one of national boundaries, state lines, interstate highways, coastlines and major waterways.

17. The system as recited in claim 15 wherein the first type of geographic data comprises data relating to at least one of city limits, streets and minor waterways.

18. The system as recited in claim 15 wherein the first type of geographic data comprises local addresses and phone numbers.

19. The system as recited in claim 15 wherein the wide area detail database comprises data stored on at least one of a hard drive, CD-ROM media, DVD-ROM media and flash media.

20. The system as recited in claim 15 wherein the mobile docking station is disposed within a vehicle.

* * * * *